June 30, 1970  R. K. SWANSON  3,517,773
CHECK-OUT SYSTEM AND COUNTER FOR USE WITH CANTILEVER SHOPPING CART
Filed June 18, 1968  2 Sheets-Sheet 1

INVENTOR
Russell K. Swanson

BY Schmidt, Johnson, Hovey,
Williams & Bradley
ATTORNEYS.

June 30, 1970 R. K. SWANSON 3,517,773
CHECK-OUT SYSTEM AND COUNTER FOR USE WITH CANTILEVER SHOPPING CART
Filed June 18, 1968 2 Sheets-Sheet 2

INVENTOR
Russell K. Swanson

BY Schmidt, Johnson, Hovey,
Williams & Bradley
ATTORNEYS.

United States Patent Office 3,517,773
Patented June 30, 1970

3,517,773
CHECK-OUT SYSTEM AND COUNTER FOR USE WITH CANTILEVER SHOPPING CART
Russell K. Swanson, 3212 Coleman Road,
Kansas City, Mo. 64111
Filed June 18, 1968, Ser. No. 738,012
Int. Cl. E04 3/04
U.S. Cl. 186—1     10 Claims

ABSTRACT OF THE DISCLOSURE

A check-out system and counter for use with a cantilever shopping cart, the counter having an overhanging top and at least one open end to present an unobstructed stretch beneath the top, which stretch receives the wheeled frame of a shopping cart having a cantilevered basket whereby, as the frame passes along said open stretch, the basket is moved over the counter top. The counter is positioned in such a manner as to define a customer's aisle on one side thereof, there being a checker's area on the opposite side of the counter, and a cash register stand in the checker's area, the stand and the top of the counter cooperating to define a path into the checker's area, the open end of the counter being adjacent the path and the path being of a width less than that of the basket but greater than that of the standard which supports the basket whereby the standard may pass along the said path into the checker's area with the basket in overlying relationship to the top of the counter.

---

It is the most important object of this invention to provide a check-out system and counter for use with a cantilever shopping cart of the type disclosed in my U.S. Letters Pat. No. 3,052,319, issued Sept. 4, 1962. To this end, there is provided a particular counter unit which cooperates with a cash register stand to define a check-out system for use with a cantilever shopping cart such as disclosed in said patent and which cart has a cantilevered basket supported by an upright standard carried by a wheeled frame.

Thus, the most significant aim of this invention is to provide a check-out system wherein a counter having an overhanging top and at least one open end, is positioned in such a manner to define a customer's aisle on one side thereof and a checker's area on the opposite side thereof, there being a cash register stand in the checker's area which cooperates with the overhanging top of the counter to define a path into said checker's area whereby the upright standard may pass along said path into the checker's area, thereby positioning said basket in overlying relationship to the top of the counter and the wheeled frame in underlying relationship to the top, all to the end that the contents of the basket may be quickly and easily unloaded by the checker, checked out, sacked and, if desired, the sacks reloaded into the basket.

Another important object of this invention is to provide, in a check-out system for use with a shopping cart having a cantilevered basket, a check-out counter having an overhanging top which is provided with a peripheral edge, and which top defines an unobstructed stretch therebetween, the stretch extending from one open end of the counter to the other end thereof and being of sufficient depth throughout its length to receive a major portion of the wheeled frame as the latter moves through such open stretch whereby to position the basket of the cart in overlying relationship to the top of the counter.

A yet further important object is to provide a check-out counter which has a framework, a front wall carried by the framework, and an overhanging top also carried by the framework and extending in one direction from the front wall whereby to present an unobstructed open stretch therebeneath of sufficient depth to receive a major portion of the wheeled frame of the cart.

Other objects will become apparent from the following specification and accompanying drawing, wherein.

Figure 1:
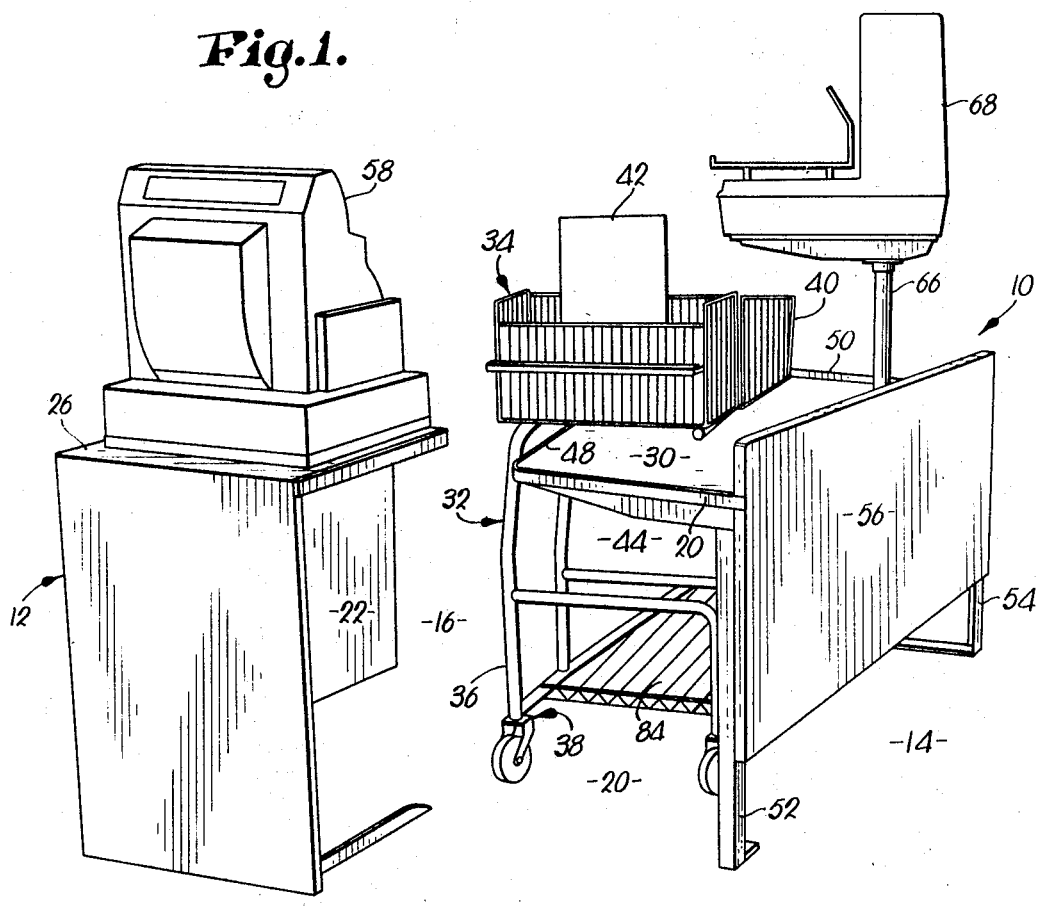
FIG. 1 is a perspective view of the counter, cantilevered cart and cash register stand of the check-out system and showing the cart within the checker's area.
Figure 2:
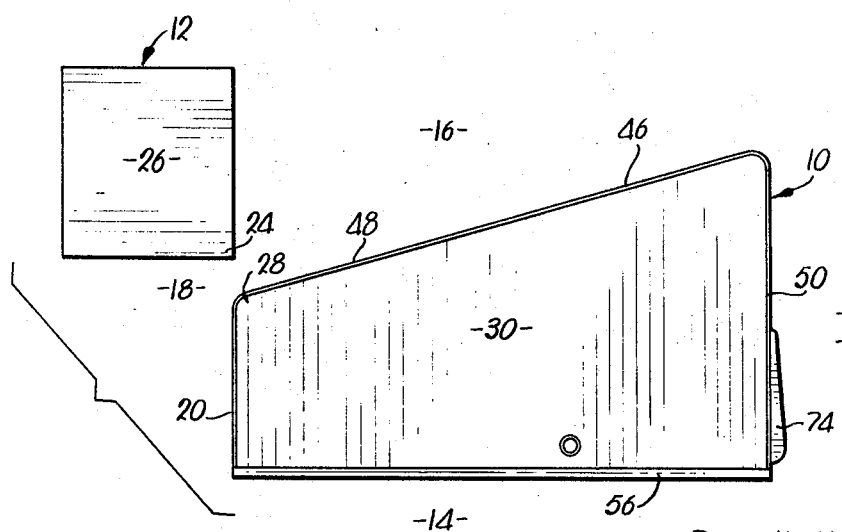
FIG. 2 is a top plan view of the counter and the cash register stand in position to comprise the system.
Figure 3:
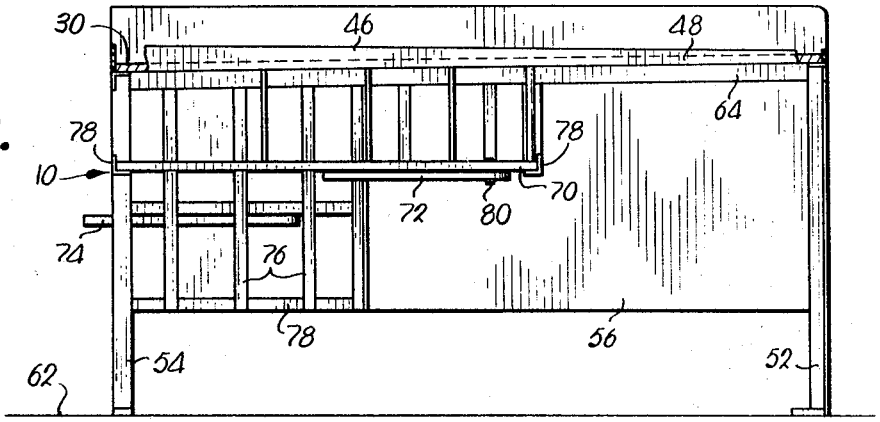
FIG. 3 is a rear elevational view of the check-out counter, parts being in section to reveal details of construction.

The check-out system, as best seen in FIGS. 1 and 2 of the drawings, comprises a counter 10 and a cash register stand 12, the same being arranged in predetermined calculated relationship whereby to define said check-out system. To this end, the counter assembly is positioned in such a manner as to define a customer's aisle 14 on one side thereof and a checker's area 16 on the opposite side thereof, the cash register stand 12 being positioned at one end of said checker's area. A path 18 leads into the checker's area, the path 18 consisting essentially of that area between one open end 20 of the counter 10 and an adjacent sidewall 22 of the cash register stand 12 and, more particularly, being defined by a corner 24 of the top 26 of the cash register stand, and a corner 28 of the overhanging top 30 of the counter 10.

The system hereinabove defined is intended for use with a cantilever shopping cart of the type disclosed in my Pat. No. 3,052,319, which cart 32 includes as its basic components, a cantilevered basket 34 supported at one corner thereof by an upright standard 36, the standard being carried by a wheeled frame 38 whereby to impart the usual portability to the cart. The basket 34, in the particular embodiment of the cart chosen for illustration herein, is provided with a swinging front gate 40 which is swung along a horizontal axis at the bottom thereof whereby the gate 40 may be swung open to permit the contents, such as groceries 42 of basket 34, to be moved outwardly in an essentially horizontal path onto the top 30 of counter 10.

In order to accomplish the foregoing, the check-out system is specifically arranged in such a manner that the standard 36 of the cart 32 may pass along path 18 into the checker's area 16, the path 18 being of a width less than that of the basket 34 but greater than that of the standard 36 whereby, as the standard 36 moves along path 18 and between corners 24 and 28, the wheeled frame 38 is received within an unobstructed stretch 44 which extends beneath the overhanging top 30 of the counter, thereby permitting the basket 34 to be moved into overlying relationship to the counter top 30.

To insure that such a relationship is achieved as the cart 32 is moved by the customer or checker into the checker's area 16, there is provided, on top 30, a peripheral edge 46, a portion 48 of said edge being engageable with the standard 36 as the cart 32 is moved along path 18. This engagement is best illustrated in FIG. 1 of the drawings wherein it is seen that portion 48 serves to guide the cart in such a manner that the basket 34 is positioned in overlying relationship to the top 30.

In order to properly accommodate the basket 34 carried in cantilever fashion by the standard 36, the top 30 of the counter 10 increases in width from the end 20 thereof proximal to the path 18 toward the other end 50 thereof, the width of counter top 30 being measured transversely thereof. Accordingly, there is presented, adjacent end 50 of the counter 10, a greater working surface area than at the other end thereof whereby the contents 42 may be moved outwardly of the cart through gate 40 and onto the top 30 of counter 10.

Notwithstanding the increasing width of the top 30 of counter 10, the unobstructed stretch beneath said overhanging top 30 is of substantially constant depth throughout the length thereof, this being a further result of the particular plan configuration of the counter top 30 and the fact that the same is supported at end 20 thereof by a single leg 52 and at the other end 50 thereof by a pair of legs 54. However, sufficient room is provided for the supporting legs 54, notwithstanding the fact that there are a pair of such legs, by the increase in width of counter top 30.

Counter 10 is also provided with a front wall 56 which serves to primarily define the major portion of the customer aisle 14, said front wall 56 extending upwardly beyond the horizontal plane of counter top 30 and being spaced from the cash register stand 12 a distance at least greater than the greatest transverse dimension of the basket 34 of cart 32. This for the reason that cash register stand 12 normally supports, on the top 26 thereof, a cash register 58 and, in order for the system described herein to function effectively, the basket 34 must pass between the cash register 58 and the front wall 56 when the standard 36 is moved along path 18.

It will also be noted that the top 26 of cash register stand 12 and the counter top 30 are in substantially the same horizontal plane whereby to permit the checker, who is positioned in area 16 to operate at substantially the same work level at all times.

In use, the components of the check-out system, namely, the counter 10 and cash register stand 12, are positioned as shown in FIGS. 1 and 2 whereby to define aisle 14, area 16, and path 18. When a cantilevered cart such as 32 approaches the check-out system, the customer may initially introduce standard 36 into the path 18 whereby the normally forwardmost portion of the wheeled frame 38 is initially received in the open end 20 of counter 10.

From this point, either the customer or the checker may subsequently move standard 36 along path 18, thereby fully introducing cart 32 into the checker's area 16 as by moving the basket into overlying relationship with the counter top 30 and maintaining the wheeled frame 38 within the open stretch 44 beneath said counter top 30.

It will be appreciated, however, that as soon as the normally forwardmost end of cart 32 is in overlying relationship to counter top 30, the gate 40 may be opened and contents 42 removed from the cart and easily slid out onto the counter top, the prices thereof being tabulated on the cash register 58 as the individual items are moved from the basket onto the counter top. Manifestly, the particular position of the cantilevered cart 32 with respect to the cash register stand 12 and counter 10 will be most conveniently determined by the checker as the system is utilized. In this regard, it will be appreciated that the quantity of contents of basket 34 would be somewhat determinative of the exact position of the cart with respect to the system.

In any event, once the items 42 have been removed from basket 34, it being noted that this is accomplished without any bending, stooping or lifting on behalf of the checker, the same can be sacked by utilizing the wider portion of the top 30 adjacent end 50 thereof while maintaining the basket 34 in overlying relationship to counter top 30. Once sacked, the sacks can be placed into basket 34, either through gate 40 or as by lifting the same thereinto, and the path of movement of the cart 32 with respect to counter 10 continued until such time as wheeled frame 36 completes its path of travel through open stretch 44 and basket 34 completes its path of travel over top 30 whereby the cart may be moved onto a delivery position as at the customer's car.

The counter 10 is specifically defined to function as a component of the system hereinabove described and, to this end, is provided with a framework 60 which is positioned above a supporting surface 62 as by legs 52 and 54, the framework 60 having a plurality of top beams 64 which are positioned in the same horizontal plane whereby to support overhanging counter top 30, it being noted that transversely disposed end beams 64 are supported in such a manner that the top 30 is an overhanging top whereby to present hereinabove described open stretch 44 therebeneath. Top beams 64 may, if desired, carry a scale support 66 which, in turn, receives a scale 68 substantially intermediate the ends of counter top 30, said scale 68 to be used in checking out and determining the price of certain items. If desired, however, the scale may be placed in a suitable well in the counter top.

The framework 60 also includes a plurality of shelves which are positioned beneath the top 30 and adjacent said open stretch 44, these being in the nature of a fixed shelf 70, a first swingable shelf 72, and a second swingable shelf 74. Said shelves 70, 72 and 74 are all positioned in a horizontal plane and in substantially parallel relationship to top 30.

In order to support said shelves there are provided a number of vertically extending struts 76 which have one end thereof attached to suitable top beams 64 and the other ends thereof attached to horizontally positioned shelf supports 78 whereby to present suitable supporting framework for said shelves.

Figure 4:
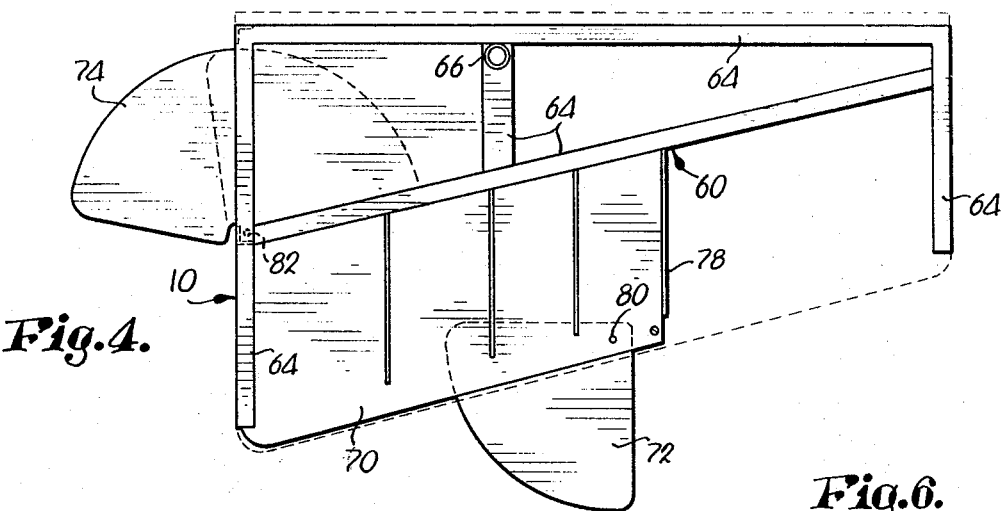
FIG. 4 is a top plan view of the check-out counter with the top being removed.
Figure 5:
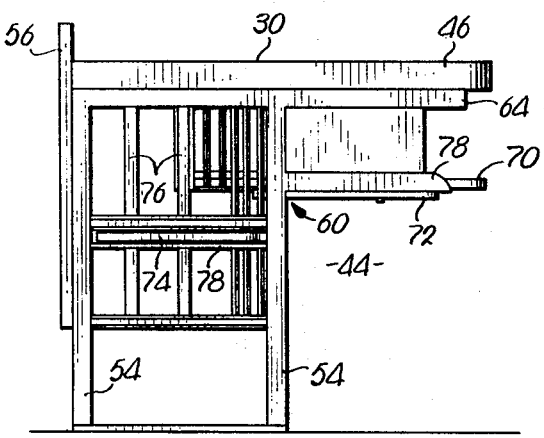
FIG. 5 is an elevational view of the left end of the check-out counter viewing FIG. 4.
Figure 6:
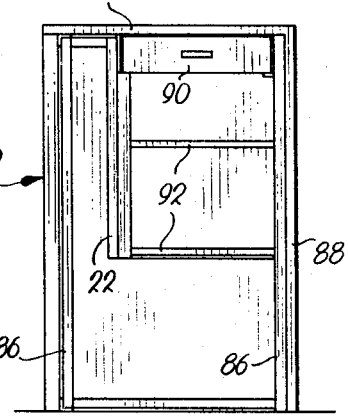
FIG. 6 is a rear elevational view of the cash register stand.

Shelf 70 is fixedly supported by a plurality of such shelf supports 78, and shelf 72 is pivotally secured to such supports as by a pivot pin 80 whereby said shelf may be swung in a horizontal plane from a position received beneath said top 30 to a position within the checker's area 16, as shown for instance, in FIG. 4 of the drawings. Likewise, shelf 74 is attached to suitable supports such as 78, as by a pivot pin 82 whereby the shelf 74 may be selectively swung from a position beneath top 30 to a position extending beyond the end 50 of the counter, it being contemplated that shelf 74 would be used for supporting a sack as the items disposed upon the counter top 30 are placed into such sacks.

It will be noted that all of said frame work 60 and its various components, is positioned in such a manner as to leave unobstructed the stretch 44 beneath the counter, whereby said stretch is maintained at a substantially constant depth throughout the length thereof and permits passage of the wheeled frame 36 therealong from one end of the counter 10 to the other as the hereinabove described system in utilized.

It will be noted that cart 32 may optionally be provided with a lower basket such as 84, which lower basket is disposed beneath said top 30 and within said stretch 44 as the cart normally moves along the counter 30. However, if it is desired to gain access to said lower basket 84 it will be noted that, as is readily apparent from FIG. 1, the cart may be slightly swung into the checker's area, thereby moving basket 84 from beneath top 30 and into a position where access may be gained thereto. In order to more freely permit such access, it is contemplated that basket 34 may be swingable from a horizontal position to a vertical position whereby the checker may merely swing said basket 34 upwardly and thence gain ready access to the lower basket 84.

The cash register stand 12 is provided with suitable support structure such as 86 which, in turn, carries top 26, sidewall 22, and an opposed sidewall 88, the cash register stand having suitable drawers 90 and shelves 92 as a part thereof for the convenience of the checker.

Thus, there is provided a check-out system and counter assembly for use with cantilevered shopping carts which takes full advantage of the significant characteristics of such carts, permitting greater and more efficient use thereof.

Having thus described the invention, what is claimed as new and desired to be secured by Letters Patent is:

1. A check-out system for use with a shopping cart having a cantilevered basket supported by an upright standard carried by a wheeled frame, said system comprising:
    a counter having an overhanging top and at least one open end, said counter defining one edge of a customer's aisle on one side thereof, there being a checker's area on the opposite side of said counter; and
    a cash register stand in said checker's area, said stand and said top cooperating to define a path into said checker's area, said open end of the counter being between said path and said aisle, said path having a width less than that of the basket but greater than that of said standard whereby said standard may pass along said path into the checker's area, with said basket in overlying relationship to said top and said frame underlying the top, said top having a peripheral edge, a portion of said edge being engageable with said standard as the latter passes along said path whereby to guide said basket over said top.

2. A check-out system as set forth in claim 1, said top increasing in width from the end thereof proximal to said path toward the other end thereof.

3. A check-out system as set forth in claim 2, said counter having a front wall adjacent said customer's aisle, the distance between said front wall and said cash register stand being greater than the largest transverse dimension of said basket.

4. A check-out system as set forth in claim 1, said overhanging top presenting an unobstructed stretch therebeneath extending from said open end to the other end of said counter, said stretch being of sufficient depth to receive the major portion of the wheeled frame when said basket is in overlying relationship to said counter top.

5. A check-out system as set forth in claim 4, the depth of said stretch being substatially constant throughout the length of the stretch.

6. A check-out system as set forth in claim 5, said top of the counter and the top of the cash register stand lying in substantially the same horizontal plane .

7. A check-out system for use with a shopping cart having a cantilevered basket supported by an upright standard carried by a wheeled frame, said system comprising:
    a counter having an overhanging top, said overhanging top presenting an unobstructed stretch therebeneath extending from one end to the other end of the counter, said counter defining one edge of a customer's aisle on one side thereof, there being a checker's area on the opposite side of the counter; and
    a cash register stand in said checker's area, said stand and said top cooperating to define a path into said checker's area, said one end of the counter being between said path and said aisle, said counter including support means for said overhanging top, a portion of said support means being located between said unobstructed stretch and said aisle, said unobstructed stretch being open toward said checker's area to permit the passage of said wheeled frame through said one end into said checker's area, said path having a width less than that of the basket but greater than that of said standard whereby said standard may pass along said path into the checker's area with the basket in overlying relationship to said top and said frame underlying said overhanging top, said stretch being of sufficient horizontal depth throughout its length to receive the major portion of the wheeled frame when said basket is in overlying relationship to the counter top.

8. A check-out system as set forth in claim 7, the depth of said stretch being substantially constant throughout the length of the stretch.

9. A check-out system as set forth in claim 7, said counter including shelves beneath said overhanging top, the lower shelf of said shelves being spaced above the uppermost point on said wheeled frame to permit passage of said wheeled frame therebeneath.

10. A check-out counter and cash register stand combination for use with a shopping cart having a wheel supported frame and a polygonal basket supported in vertically spaced, overlying relationship to said frame by an upright standard at one side of the basket comprising:
    an overhanging top and at least one open end presented by said counter, the counter defining one edge of a customer's aisle on one side thereof, there being a checker's area on the opposite side of the counter, said cash register stand being positioned in the checker's area; and
    a path defined by said top and said stand and extending into said checker's area, said open end of the counter being between the path and the aisle, the counter including means for simultaneously guiding the wheel supported frame into said open end, the standard along said path and the basket into overlying relationship to said counter top when the cart is positioned with its said one side and upright standard toward the cash register stand, whereby the cart may be moved through said checker's area.

References Cited

UNITED STATES PATENTS

| | | |
|---|---|---|
| 2,980,212 | 4/1961 | Foster. |
| 3,052,319 | 9/1962 | Swanson. |
| 3,140,758 | 7/1964 | Berg. |

HARVEY C. HORNSBY, Primary Examiner